United States Patent
Celata

(10) Patent No.: US 9,726,173 B2
(45) Date of Patent: Aug. 8, 2017

(54) VARIABLE DISPLACEMENT LUBRICANT PUMP FOR AN INTERNAL COMBUSTION ENGINE WITH A TEMPERATURE CONTROL VALVE

(71) Applicant: PIERBURG PUMP TECHNOLOGY GMBH, Neuss (DE)

(72) Inventor: Bernardo Celata, Leghorn (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 14/440,878

(22) PCT Filed: Nov. 8, 2012

(86) PCT No.: PCT/EP2012/072135
§ 371 (c)(1),
(2) Date: May 6, 2015

(87) PCT Pub. No.: WO2014/071976
PCT Pub. Date: May 15, 2014

(65) Prior Publication Data
US 2015/0354565 A1    Dec. 10, 2015

(51) Int. Cl.
*F03C 2/00*    (2006.01)
*F03C 4/00*    (2006.01)
(Continued)

(52) U.S. Cl.
CPC .............. *F04C 14/24* (2013.01); *F01M 1/02* (2013.01); *F04C 2/3448* (2013.01);
(Continued)

(58) Field of Classification Search
CPC ........ F04C 2/344; F04C 18/344; F04C 14/10; F04C 14/223; F04C 14/24; F04C 15/06;
(Continued)

(56) References Cited

U.S. PATENT DOCUMENTS 3,985,296 A    10/1976  Fujiwara
5,536,215 A    7/1996   Shaffer et al.
(Continued)

FOREIGN PATENT DOCUMENTS

CN    1782417 A    6/2006
CN    202441562 U  9/2012
(Continued)

*Primary Examiner* — Theresa Trieu
(74) *Attorney, Agent, or Firm* — Norman B. Thot

(57) ABSTRACT

A variable displacement lubricant pump for providing a pressurized lubricant for an internal combustion engine includes a control ring configured to be shiftable, a pump rotor comprising a plurality of slidable vanes which are configured to rotate in the control ring, a hydraulic control chamber configured to directly actuate the control ring, a valve bore, and a temperature control valve configured to connect or disconnect the temperature control opening to an atmospheric pressure. The hydraulic control chamber comprises a side wall comprising a temperature control opening arranged therein. The temperature control valve comprises a switching strip which comprises a switching temperature. The switching strip is configured to be in an open position if a temperature is below the switching temperature, and to be in a closed position if the temperature is above the switching temperature so as to close the valve bore.

10 Claims, 3 Drawing Sheets

(51) Int. Cl.
*F04C 2/00* (2006.01)
*F04C 14/24* (2006.01)
*F04C 2/344* (2006.01)
*F04C 13/00* (2006.01)
*F04C 15/06* (2006.01)
*F04C 14/10* (2006.01)
*F01M 1/02* (2006.01)
*F04C 14/22* (2006.01)
*F16K 31/00* (2006.01)
*F16K 15/16* (2006.01)

(52) U.S. Cl.
CPC ............ *F04C 13/002* (2013.01); *F04C 14/10* (2013.01); *F04C 14/223* (2013.01); *F04C 15/068* (2013.01); *F16K 15/16* (2013.01); *F16K 31/002* (2013.01); *F04C 2/344* (2013.01); *F04C 2270/19* (2013.01)

(58) Field of Classification Search
CPC .. F04C 15/068; F04C 2270/19; F04C 2/3448; F04C 13/002; F16K 15/147; F16K 15/144; F16K 15/16; F16K 31/002; F01M 1/02

USPC ........ 418/24, 26–27, 259, 270, 93; 137/849, 137/855

See application file for complete search history.

(56) References Cited

U.S. PATENT DOCUMENTS

| | | |
|---|---|---|
| 2005/0112008 A1* | 5/2005 | Cho .................... F04C 18/3564 418/11 |
| 2005/0135940 A1 | 6/2005 | Jeong |
| 2008/0038117 A1 | 2/2008 | Armenio et al. |
| 2008/0069704 A1 | 3/2008 | Armenio et al. |
| 2012/0183426 A1 | 7/2012 | Maffeis |
| 2013/0136641 A1 | 5/2013 | Novi et al. |

FOREIGN PATENT DOCUMENTS

| | | | |
|---|---|---|---|
| EP | 1 716 336 B1 | 11/2006 | |
| EP | 2 264 318 A1 | 12/2010 | |
| JP | 60169688 A * | 9/1985 | .............. F04C 29/02 |
| WO | WO 2005/026553 A1 | 3/2005 | |
| WO | WO 2012/013232 A1 | 2/2012 | |

* cited by examiner

VARIABLE DISPLACEMENT LUBRICANT PUMP FOR AN INTERNAL COMBUSTION ENGINE WITH A TEMPERATURE CONTROL VALVE

CROSS REFERENCE TO PRIOR APPLICATIONS

This application is a U.S. National Phase application under 35 U.S.C. §371 of International Application No. PCT/EP2012/072135, filed on Nov. 8, 2012. The International Application was published in English on May 15, 2014 as WO 2014/071976 A1 under PCT Article 21(2).

FIELD

The present invention relates to a variable displacement lubricant pump for providing pressurized lubricant for an internal combustion engine.

BACKGROUND

The mechanical pump comprises a pump rotor with radially slidable vanes rotating within a shiftable control ring, whereby the control ring is pushed by a plunger which pushes the control ring into high pumping volume direction. The plunger is shiftably arranged in a control chamber. The pump comprises a pressure control system for controlling the discharge pressure of the pressurized lubricant leaving the pump. The pump's discharge pressure is controlled by controlling the position of the shiftable control ring by controlling the pressure in the hydraulic control chamber, thereby moving the plunger.

Variable displacement vane pumps have previously been described in WO 2005/026553 A1. The pump is provided with a pressure control system for controlling the discharge pressure of the lubricant. The pressure control system comprises a first pressure control chamber, wherein a first plunger is provided so as to be axially movable. The first pressure control chamber is connected via a pressure conduit with the pump outlet port. The pressure control system also comprises a separate control element which is realized as a cylinder-piston-element which keeps the pressure of the pressurized lubricant provided by the pump at a more or less constant level independent of the rotational speed of the pump rotor. This is realized by opening and closing a control outlet of the first pressure control chamber, thereby moving the control ring into a low pumping volume direction or pushing the control ring into a high pumping volume direction.

The lubricant pressure demand of the engine and the mechanical stress of the pump is, however, dependent on working conditions, such as the engine's and the lubricant's temperature.

SUMMARY

An aspect of the present invention is to provide a simple and reliable variable displacement lubricant vane pump with different lubricant pressures levels which are dependent on the lubricant temperature.

In an embodiment, the present invention provides a variable displacement lubricant pump for providing a pressurized lubricant for an internal combustion engine which includes a control ring configured to be shiftable, a pump rotor comprising a plurality of slidable vanes which are configured to rotate in the control ring, a hydraulic control chamber configured to directly actuate the control ring, a valve bore, and a temperature control valve configured to connect or disconnect the temperature control opening to an atmospheric pressure. The hydraulic control chamber comprises a side wall comprising a temperature control opening arranged therein. The temperature control valve comprises a switching strip which comprises a switching temperature. The switching strip is configured to be in an open position if a temperature is below the switching temperature, and to be in a closed position if the temperature is above the switching temperature so as to close the valve bore.

BRIEF DESCRIPTION OF THE DRAWINGS

The present invention is described in greater detail below on the basis of embodiments and of the drawings in which.

DETAILED DESCRIPTION

Figure 1:
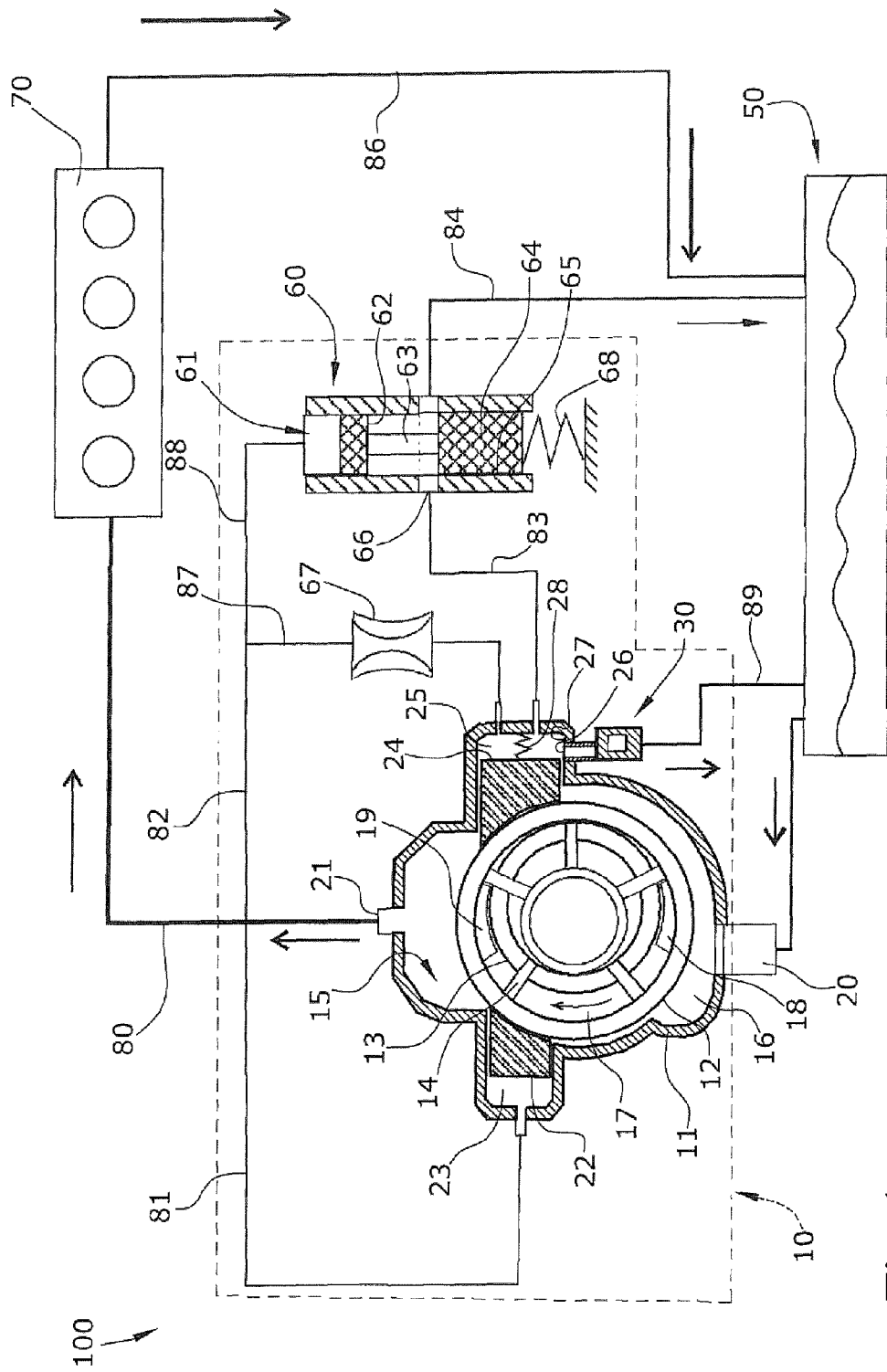
FIG. 1 shows a schematic representation of a variable displacement lubricant pump including a temperature control valve, the pump being arranged in a lubricant circuit including an internal combustion engine.

The variable displacement lubricant vane pump according to the present invention is provided with a temperature control opening in a wall of the control chamber. A temperature control valve is provided downstream of the temperature control opening which connects or disconnects the temperature control opening to the atmospheric pressure dependent on the lubricant temperature T. The temperature control valve is provided with a switching strip with a switching temperature, whereby the switching strip is in the open position if the lubricant temperature T is below a switching temperature $T_s$ and is in the closed position if the lubricant temperature T is above of the switching temperature $T_s$ of the switching strip.

In an embodiment of the present invention, the switching strip can, for example, be provided as a bimetal strip. A bimetal switching strip is a simple, cost-effective, and reliable valve concept which allows two different lubricant discharge pressure levels to be defined dependent on the lubricant temperature.

In an embodiment of the present invention, the temperature control valve can, for example, be provided with a separate closing body strip. The closing body strip is actuated by the switching strip. The valve bore is directly closed and left open by the closing body strip, and not directly by the switching strip.

In an embodiment of the present invention, the closing body strip can, for example, be preloaded in its closing position so that the closing body strip defines a non-return reed valve. The closing body strip can, for example, be realized as a flexible tongue body. The temperature control valve is a unidirectional non-return reed valve in the open position of the switching strip. In the closed position of the switching strip, the closing body strip is forced and kept in its closing position so that the temperature control valve is closed in both flow directions.

In an embodiment of the present invention, a stop strip can, for example, be provided to limit the opening angle of the switching strip. The stop strip is stiff and remains in the same position and angle independently of the lubricant temperature, and limits the maximum opening movement of the switching strip.

In an embodiment of the present invention, the strips can, for example, be provided as a strip packet which can, for example, be held together by one single screw. The strips defining the strip packet generally have the same contour so as to define a rectangular strip packet.

In an embodiment of the present invention, the switching temperature $T_s$ of the switching strip is between 60° C. and 100° C., for example, between 70° C. and 90° C.

In an embodiment of the present invention, the temperature control opening can, for example, be provided at a side wall of the control chamber, and a plunger element of the control ring can, for example, shift along the side wall to thereby cover or not cover the control opening.

The present invention is hereinafter further described with a detailed description of an embodiment of the present invention under reference to the drawings.

FIG. 1 shows a variable displacement lubricant pump 10 as a part of a pumping system 100 for supplying an internal combustion engine 70 with pressurized lubricant. From the internal combustion engine 70, the lubricant flows back via a flow-back conduit 86 to a lubricant tank 50 with more or less atmospheric pressure.

The lubricant pump 10 comprises a pump housing 11 having a cavity 16 in which a radially shiftable control ring 12 translates. The shiftable control ring 12 encircles a pump rotor 13 which is provided with numerous radially slidable vanes 14, whereby the vanes 14 rotate inside the shiftable control ring 12. The pump housing 11 comprises two pump side walls 15 of which one is not shown in FIG. 1 so that the inside of the lubricant pump 10 can be seen. The pump side walls 15, the vanes 14, the pump rotor 13, and the shiftable control ring 12 define five rotating pump chambers 17. One of the side walls 15 is provided with a pump chamber inlet opening 18 and with a pump chamber outlet opening 19.

The shiftable control ring 12 is provided with a first plunger 24 housed in part in a first hydraulic control chamber 25, and with a second plunger 22 housed in part in a second hydraulic control chamber 23 opposite to the first hydraulic control chamber 25.

A pretensioned spring 28 inside the first hydraulic control chamber 25 exerts a pushing force on the first plunger 24. Both hydraulic control chambers 25, 23 are formed inside and by the pump housing 11. The pump housing 11 also comprises a pump intake port 20 to suck the lubricant from the lubricant tank 50, and a pump outlet port 21 to feed lubricant with a discharge pressure to the internal combustion engine 70. A conduit 80 extends from the pump outlet port 21 to supply the internal combustion engine 70.

The lubricant which is supplied to the internal combustion engine 70 is conducted to the second hydraulic control chamber 23 via a pressure conduit 81, and the lubricant is fed to the first hydraulic control chamber 25 via pressure conduits 82, 87. More specifically, the lubricant in pressure conduit 82 is finally fed to the first hydraulic control chamber 25 via pressure conduit 87 through a pressure throttle valve 67 in which a calibrated pressure drop occurs as the lubricant flows through.

The pressure conduits 82, 88 are connected to a control port of a first pressure control valve 60 by a conduit. The first pressure control valve 60 comprises a cylinder 65 housing a piston 61. More specifically, the piston 61 comprises a first portion 62 and a second portion 64 connected to each other by a rod 63. The piston portions 62 and 64 are equal in cross section to the cross section of the cylinder 65, whereas the rod 63 is smaller in cross section than the cylinder 65. The cylinder 65 is provided with an inlet port 66 connected hydraulically to the first hydraulic control chamber 25 by a conduit 83 and is provided with an outlet port which is hydraulically connected to the lubricant tank 50 by a conduit 84. Another conduit 88 transfers the discharge pressure in conduit 82 to the front surface of the first portion 62 of piston 61. The dashed line in FIG. 1 shows the situation when the inlet port 66 of the first pressure control valve 60 is closed by the second portion 64 of the piston 61.

The first hydraulic control chamber 25 is provided with a temperature control opening 26 connected hydraulically to a temperature control valve 30. The temperature control opening 26 is provided in a side wall 27 of the first hydraulic control chamber 25 so that the first plunger 24, sliding along the side wall 27, thereby covers and closes the temperature control opening 26 or leaves the temperature control opening 26 open, dependent on the position of the first plunger 24 inside the first hydraulic control chamber 25. If the temperature control valve 30 is open, the first hydraulic control chamber 25 is connected to the lubricant tank 50 having atmospheric pressure.

Figure 2:
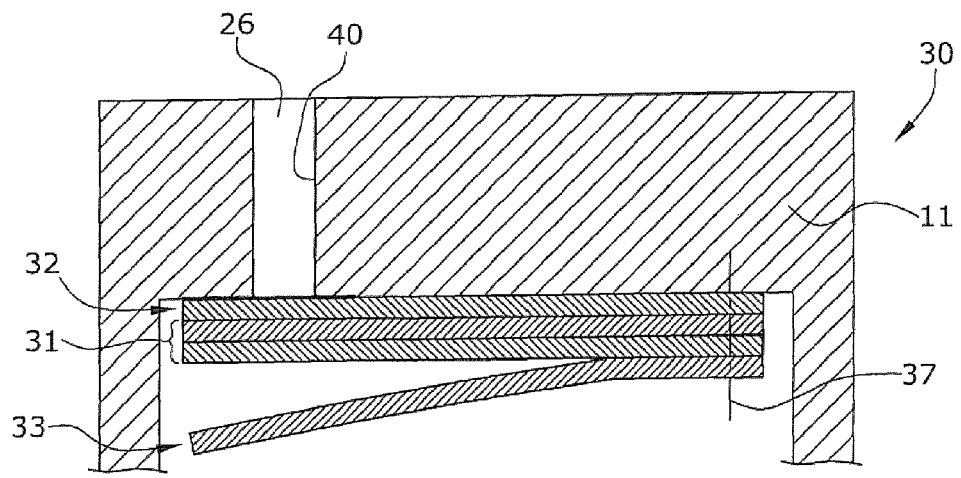
FIG. 2 shows a cross section of an embodiment of a temperature control valve in the closed position.
Figure 3:
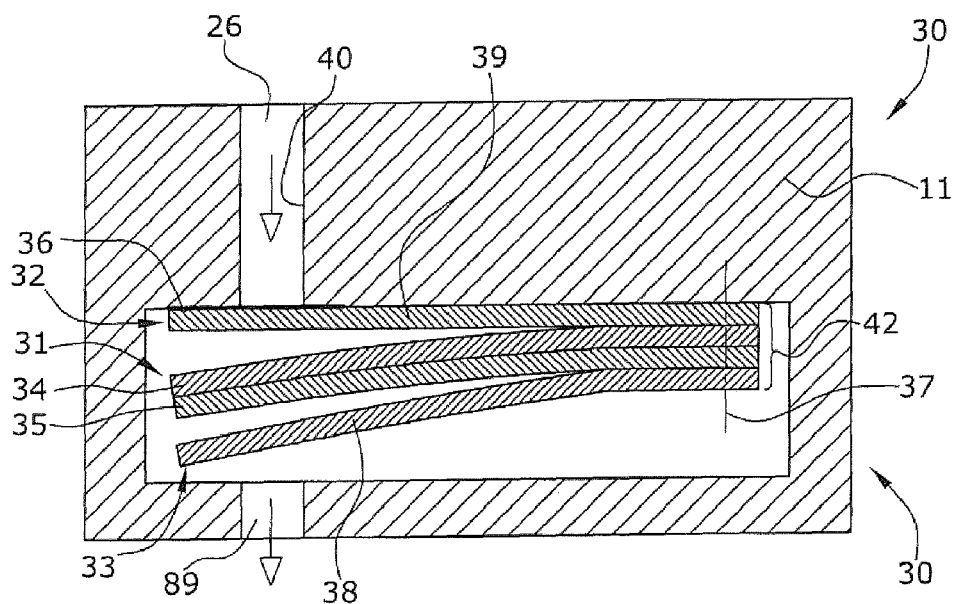
FIG. 3 shows the temperature control valve of FIG. 2 in the open position.

An embodiment of the temperature control valve 30 is shown in FIGS. 2 and 3. The temperature control valve 30 is arranged downstream of the temperature control opening 26 and connects or disconnects, dependent on the lubricant temperature T, the temperature control opening 26 to the atmospheric pressure of the lubricant tank 50 via a lubricant conduit 89. The temperature control valve 30 is provided with a switching strip 31 with a switching temperature $T_s$, whereby the switching strip 31 is in the open position if the lubricant temperature T is below the switching temperature $T_s$ and is in the closed position if the lubricant temperature T is above of the switching temperature $T_S$ of the switching strip 31. The switching temperature $T_s$ of the switching strip is around 80° C. The switching strip 31 is provided as a bimetal strip consisting of two different metal strips 34, 35 of different thermal expansion coefficients.

The side of the switching strip 31 orientated to a valve bore 40 could be provided with a rubber layer 36 in order to improve the sealing when the switching strip 31 closes the valve bore 40. The rubber layer 36 could be co-molded or assembled, as a separate part, with the switching strip 31.

The temperature control valve 30 is provided with a separate closing body strip 32 consisting of a single metal strip body 39 of which the side orientated to a valve bore 40 is provided with a rubber layer 36. The rubber layer 36 is co-molded or assembled, as a separate part, with the single metal strip body 39 of the separate closing body strip 32. The valve bore 40 is directly covered by the separate closing body strip 32, and is not directly covered by the switching strip 31. The separate closing body strip 32 is preloaded into its closing position so that the separate closing body strip 32 defines a non-return reed valve. In the open position of the switching strip 31, as shown in FIG. 3, the temperature control valve 30 works as a unidirectional non-return reed valve so that the lubricant from first hydraulic control chamber 25 can flow to the lubricant tank 50. In the closed position of the switching strip 31, as shown in FIG. 2, the temperature control valve 30 is totally closed in both flow directions.

A stop strip 33 is provided opposite to the separate closing body strip 32, with respect to the switching strip 31, to limit the maximum opening angle of the switching strip 31. The stop strip 33 is made out of a metal strip body 38 and is stiff at every lubricant temperature. The stop strip 33 limits the opening movement of the switching strip 31 to a maximum opening angle.

The three strips 32, 31, 33 are provided as a strip packet 42 which is held together and mounted to the pump housing 11 by one single assembling screw 37. The three strips 32, 31, 33 defining the strip packet 42 have the same contour so that they define a strip packet 42 which is rectangular.

Figure 4:
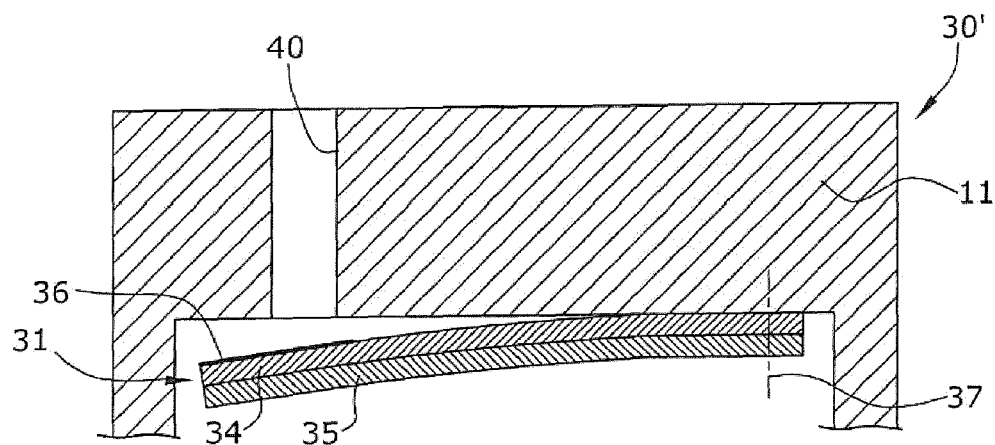
FIG. 4 shows an embodiment of a simpler temperature control valve in the open position.
Figure 5:
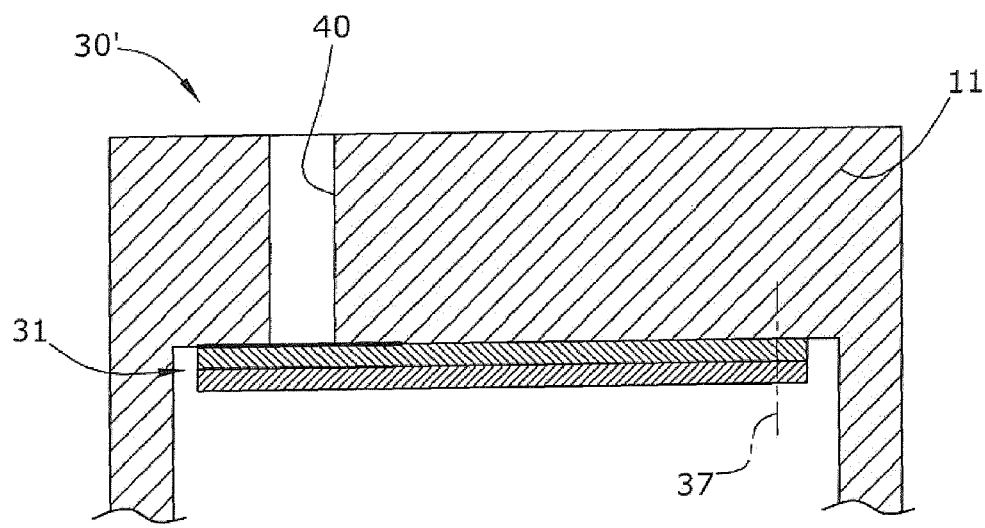
FIG. 5 shows the temperature control valve of FIG. 4 in the closed position.

An embodiment of a temperature control valve 30' is shown in FIGS. 4 and 5. This temperature control valve 30' is simpler than the temperature control valve 30 of the above embodiment, and is only provided with the switching strip 31, of which the side orientated to the valve bore 40 is provided with the rubber layer 36.

The present invention is not limited to embodiments described herein; reference should be had to the appended claims.

What is claimed is:

1. A variable displacement lubricant pump for providing a pressurized lubricant for an internal combustion engine, the variable displacement lubricant pump comprising:
   a control ring configured to be shiftable;
   a pump rotor comprising a plurality of slidable vanes which are configured to rotate in the control ring;
   a hydraulic control chamber configured to directly actuate the control ring, the hydraulic control chamber comprising a side wall comprising a temperature control opening arranged therein;
   a valve bore connected to the temperature control opening;
   a conduit connected to an atmospheric pressure; and
   a temperature control valve arranged between the valve bore and the conduit, the temperature control valve being configured to connect or disconnect the temperature control opening to the atmospheric pressure, the temperature control valve comprising a switching strip which comprises a switching temperature, the switching strip being configured to be in an open position if a temperature of the pressurized lubricant is below the switching temperature, and to be in a closing position if the temperature of the pressurized lubricant is above the switching temperature so as to close the valve bore, wherein,
   the temperature control valve is totally closed in both flow directions when in the closing position, and
   the control ring further comprises a plunger element configured to shift along the side wall so as to open or to close the temperature control opening.

2. The variable displacement lubricant pump as recited in claim 1, wherein the switching strip is provided as a bimetal strip.

3. The variable displacement lubricant pump as recited in claim 1, wherein the temperature control valve further comprises a separate closing body strip.

4. The variable displacement lubricant pump as recited in claim 3, wherein the separate closing body strip comprises a rubber layer at a side orientated to the valve bore.

5. The variable displacement lubricant pump as recited in claim 3, wherein the separate closing body strip is preloaded in the closing position so as to define a non-return reed valve.

6. The variable displacement lubricant pump as recited in claim 3, further comprising a separate stop strip configured to limit an opening angle of the switching strip.

7. The variable displacement lubricant pump as recited in claim 6, wherein the switching strip, the separate closing body strip, and the separate stop strip together comprise a strip packet.

8. The variable displacement lubricant pump as recited in claim 7, further comprising a screw, the screw being configured to hold the strip packet together.

9. The variable displacement lubricant pump as recited in claim 1, wherein the switching temperature of the switching strip is between 60° C. and 100° C.

10. The variable displacement lubricant pump as recited in claim 1, wherein the switching temperature of the switching strip is between 70° C. and 90° C.

* * * * *